United States Patent [19]

Druaux

[11] Patent Number: 4,749,857
[45] Date of Patent: Jun. 7, 1988

[54] PROCESS FOR THE FORMATION OF HIGH ENERGY NEUTRAL ATOM BEAMS BY MULTIPLE NEUTRALIZATION AND APPARATUS FOR PERFORMING THE SAME

[75] Inventor: Jean Druaux, Igny, France

[73] Assignee: Commissariat a l'Energie Atomique, Paris, France

[21] Appl. No.: 852,815

[22] Filed: Apr. 16, 1986

[30] Foreign Application Priority Data

May 7, 1985 [FR] France .................... 85 06936

[51] Int. Cl.⁴ .................................... H05H 3/02
[52] U.S. Cl. ............................ 250/251; 376/130
[58] Field of Search .................... 376/127–130, 376/120; 250/251, 396 ML

[56] References Cited

U.S. PATENT DOCUMENTS

| | | | |
|---|---|---|---|
| 3,202,817 | 8/1965 | Belbeoch | 250/396 ML |
| 3,571,642 | 3/1971 | Westcott | 376/120 |
| 4,067,702 | 1/1978 | Hickman | 376/130 |
| 4,092,534 | 5/1978 | Anderson | 376/130 |
| 4,409,486 | 10/1983 | Bates | 250/396 ML |
| 4,439,395 | 3/1984 | Kim | . |
| 4,590,379 | 5/1986 | Martin | 250/396 ML |

OTHER PUBLICATIONS

"Molecular Beams and Low Density Gasdynamics", Gasdynamics, vol. 4, Chapter 1, Molecular Beams from Nozzle Sources, James B. Anderson, pp. 1,2,3.
"Operation of a 160 keV, 37 A, Neutral Deuterium Beam Injector", Fumelli et al, pp. 617–623, 1984, 13th Symp. on Fusion Technology, in Varenna, Italy.
J. of Applied Physics, vol. 42, No. 13, Dec. 1971, pp. 5411–5417, Barr.
Instrum. & Exp. Tech., vol. 14, No. 1, P.V. 2 (Jan.–Feb. 1971), pp. 214–216, Yuferov et al.
Rev. Sci. Instrum., vol. 47, No. 12, Dec. 1976, pp. 1450–1452, Bayfield.

Primary Examiner—Harvey E. Behrend
Attorney, Agent, or Firm—Stevens, Davis, Miller & Mosher

[57] ABSTRACT

Process and apparatus for forming high energy neutral atom beams by multiple neutralization.

Following a first neutralization, the ions contained in the first neutral particle beam are separated by deflection by means of a quasi-achromatic magnetic doublet and a second neutralization is performed to obtain a second neutral particle beam. More than two neutralizations are possible.

Application to the heating of the plasmas of thermonuclear reactors.

13 Claims, 4 Drawing Sheets

PROCESS FOR THE FORMATION OF HIGH ENERGY NEUTRAL ATOM BEAMS BY MULTIPLE NEUTRALIZATION AND APPARATUS FOR PERFORMING THE SAME

BACKGROUND OF THE INVENTION

The present invention relates to a process and apparatus for the formation of high energy neutral atom beams by multiple neutralization. A preferred application thereof is in the heating of plasmas of thermonuclear reactors.

In order to fulfill the conditions necessary for producing energy by thermonuclear reactions with a fuel mixture (e.g. deuterium and tritium) one of the possible methods is the magnetic confinement of a plasma. In this case, it is necessary to obtain a particle density of $10^{20}$ m$^{-3}$ and simultaneously a temperature of 10 keV or $\sim 10^8$ K. for a plasma confinement time of one second (Lawson criterion).

In existing toroidal plasma machines, the small torus radius is that of the plasma and is equal to approximately 2 meters, the large torus radius being equal to approximately 10 meters, whilst the toroidal magnetic confinement field is 3 to 4 Teslas.

The heating of such a plasma by an electron current (ohmic heating) is limited to approximately 1 to 2 keV due to the reduction in the resistivity of the plasma when the temperature thereof rises. For this reason, it is necessary to add an auxiliary heating to increase said temperature and pass it from 2 to 10 keV.

One of the known auxiliary heating means consists of injecting into the plasma fast particles produced outside the plasma and which enter the reactor through one or more openings made in coils producing the toroidal field.

These particles must be neutral in order to be able to over come the magnetic field without being deflected.

A known process then comprises firstly producing ions, then accelerating the latter in an electrostatic field, followed by the neutralization of the accelerated ions by charge exchange in a gas or vapour-filled cell. The thus formed fast neutral particles are able to pass through the magnetic barrier of the machine. On traversing the plasma they are ionized and rapidly degrade their energy by heating the plasma. Bearing in mind the effective interaction cross-sections between the beam of neutral particles and the plasma of a reactor previously defined by its density and dimensions, the energy per nucleon necessary for a 2 meter penetration is approximately 100 to 150 keV for hydrogen or 200 to 300 keV for the neutral atom of accelerated deuterium ($\vec{D_1}$).

The hitherto used processes comprise accelerating a light positive ion beam (H$^+$ or D$^+$) from a cooled grid ion source. The transparency of the grids is approximately 40 to 50% of the total surface of the source. Such sources produce beams, whose current density is approximately 2000 A/m$^2$ and with a limited angular divergence (approximately 0.7°).

The ions are then partly neutralized in a gaseous target produced in a tube of approximate length 2 m, whose cross-section is that of the beam. Under molecular conditions, a non-ionized gas from the ion source flows along this tube. This device constitutes a "Maxwellian neutralizer". The thickness of the target is characterized by the mean product of the density n by the length of the neutralizer l, said product being designated l. It is necessary to have approximately $10^{20}$ particles per m$^2$ to obtain equilibrium neutralization between the neutral particles and the ions produced.

Such a gaseous target provides no supplementary divergence to the beam of ions and neutral particles. It also supplies no supplementary particles to the beams. However, it does form a gas charge, which it is necessary to pump by appropriate systems.

The neutralization efficiency of these systems is limited towards the high energy levels (200 to 300 keV), due to the relative decrease in the effective charge exchange cross-section when the energy increases. For D$_1^+$ ions of 300 keV, this efficiency is equal to $r_N = s_{10}/s_{10} + s_{01}$ or approximately 6%, in which $s_{10}$ represents the effective capture cross-section of an electron by ion and $s_{01}$ represents the effective ionization cross-section of a fast neutral particle. At the present state of the art and at these energy levels, such phenomena do not make it very efficient to use positive ions.

This is one of the reasons why at present another method is being envisaged and consists of using negative ions (H$^-$ or D$^-$), which in principle it is possible to accelerate to 300 keV or more. The theoretical neutralization efficiency would then be approximately 60%.

However, on the one hand the current density of these sources is much lower and is approximately 200 A/m$^2$ instead of 2000 A/m$^2$ obtained with positive ions and on the other hand the acceleration and neutralization cause serious problems, due to the presence of very high electron currents accompanying the negative ions. Moreover, the neutralization of the H$^-$ ions is accompanied by a production of positive ions of the same energy as the H$^-$ and H$^o$. Bearing in mind the low relative emission of the negative ions, the size of the negative ion sources is much greater than that of the sources supplying positive ions. Thus, neither of the two methods is really satisfactory.

SUMMARY OF THE INVENTION

The object of the present invention is to obviate these disadvantages and with this aim in mind it recommends the return to the use of positive ions, but provides a means for improving the neutralization of the ion beam. The apparatus obtained has a much greater simplicity than the negative ion injectors for the same usable power.

The invention is based on the principle that it is possible to significantly increase the effective neutralization efficiency of an injection system by repeating the process of the non-neutralized particles (i.e. the ions) in the first cell, by the passage of said ions into a second neutralization cell.

In order to realize this principle, the ions remaining in the primary beam obtained following the first neutralization are firstly separated from the neutral particles by a double magnetic deflection obtained as a result of two magnetic means producing oppositely directed magnetic fields. All the said means constitute a "quasi-achromatic magnetic doublet". The thus obtained ion beam can then undergo a second neutralization.

This process makes it possible to double the neutralization efficiency of the overall system. Moreover, the structure of the system according to the invention makes it possible to use a gas which is heavier than the deuterium conventionally used for carrying out the neutralization. This makes it possible to further increase the higher energy neutralization efficiency for the following reason. The capture cross-section $s_{10}$ compared with that of the ionization $s_{01}$ is dependent on the relative velocities of the ion to be neutralized with respect the velocity of the electrons of the orbits in the atoms constituting the neutralization gas. However, the electrons of the orbits of the heavy atoms (such as neon) rotate more rapidly than those of the light atoms (such as $H_2$ or $D_2$). Therefore experience shows that an efficiency of $s_{10}/s_{10}+s_{01}$ is obtained for a heavy atom which is greater than the efficiency for a light atom with high energies (cf the articles by L. r. GRISHAM, D. E. POST, Nucl. Techno. Fusion, V2, 1982, pp 104–109 and L. H. TOBUREN et al Phy, Rev, 171.114, 1968,). This leads to a gain in the neutralization efficiency for high energy levels by a factor of 2 to 3. Therefore by combining the two arrangements provided by the invention, i.e. double neutralization and the use of heavy atoms for the neutralization, it is possible to multiply by a factor of 4 to 6 the overall neutralization efficiency compared with the simple neutralization using light atoms for the neutralization.

Thus, the beams of positive ions obtained as a result of the invention become very advantageous for producing beams of neutral particles able to heat the plasmas of thermonuclear reactors. Thus, these beams meet the two objectives aimed at for the heating of plasmas, i.e. penetrating the plasma core and an adequate injected neutral particle power.

Thus, more specifically, the present invention relates to a process for the formation of high energy neutral atom beams, particularly for heating a thermonuclear reactor plasma, in which positive ions are produced with the aid of an ion source, said ions are accelerated to form a first ion beam, the latter is partly neutralized by making it pass through a first neutralization cell to obtain, at the outlet from said cell, a first beam containing high energy neutral atoms, wherein to the beam leaving the first neutralization cell is applied a first magnetic field having a first direction perpendicular to the direction of said beam, which has the effect of separating the ions still present from the neutral particles by deflecting these ions, which form a second ion beam with a direction differing from that of the first beam containing the neutral particles, then to said second ion beam is applied a second magnetic field having the same direction as that of the first field, but in the opposite direction, which has the effect of again deflecting the ion beam and giving it a new direction crossing the direction of the first neutral particle beam this is followed by a partial neutralization of said doubly deflected second ion beam by making it traverse a second neutralization cell so that, on leaving said second cell a second beam is obtained which contains neutral atoms and crosses the first beam of neutral particles leaving the first neutralization cell.

According to an advantageous variant, to the second beam incorporating the neutral particles is applied third and fourth magnetic fields which are functionally identical to the first and second fields, to obtain a third ion beam and the latter is neutralized by a third neutralization cell, which supplies a third beam containing neutral particles, said third beam crossing the two first beams.

In general terms, after obtaining n beams containing neutral particles, it is possible to form a (n+1)th beam by applying to the nth beam containing neutral particles, two magnetic beams of opposite directions in order to bring about a double deflection of the ions still present in the nth beam and a further neutralization is carried out on the doubly deflected beam, the (n+1) beams containing the neutral particles crossing in pairs.

The invention also relates to an apparatus for forming beams of neutral atoms comprising all the means making it possible to perform the process as defined.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
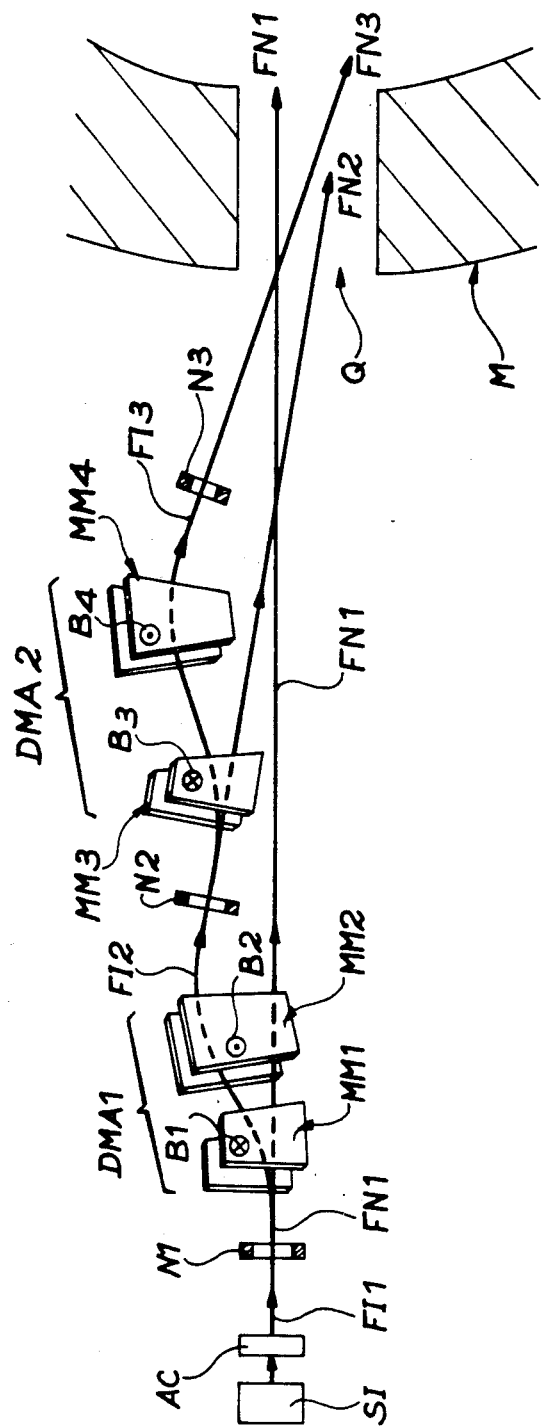
FIG. 1, the multiple neutralization principle according to the invention.

FIG. 1 shows an ion source SI associated with an electrostatic accelerator AC. As these means are well known they are not shown in detail. Thus, a first ion beam FI1 is formed, which passes through a first neutralization cell N1. The latter supplies a beam FN1 containing neutral particles, which is directed at the exhaust tube Q of a machine M, which is preferably a thermonuclear reactor. This group of means belongs to the prior art.

According to the invention, cell N1 is followed by a first magnetic means MM1 producing a magnetic field B1 perpendicular to beam FN1. This first means deflects the ions still present in beam FN1 (because the neutralization performed in N1 may only be partial). The deflection direction is given by the direction of the force exerted on the ions by field B, said direction being, as known, perpendicular both to the velocity vector of the ions and to the field. In the illustrated example, as field B1 is perpendicular to the plane of the drawing and is directed rearwards, the force is directed in the plane of the drawing and upwards. The trajectory of the ions, on curving inwards, is separated from that of the neutral atoms, but remains in the plane of the drawing.

According to the invention, there is also a second magnetic means MM2 producing a magnetic field B2 in the same direction as B1 but of the opposite sense, i.e. directed towards the front of the plane of the drawing. On passing through said second means, the ion beam is again deflected, but in the opposite direction, i.e. in the present case downwards. This leads to a second ion beam FI2. By adjusting the position and characteristics of the two means MM1 and MM2, it is possible to give ion beam FI2 a direction such that it crosses the direction of the beam of neutral particles FN1. The second ion beam FI2 then traverses a second neutralization cell N2, which supplies a second beam containing neutral particles FN2, which intersects FN1.

As the neutralization in N2 is only partial, ions remain in FN1. It is therefore possible to reiterate the process by providing a third magnetic means MM3 producing a field B3 parallel to B1 and a fourth magnetic means MM4 producing a field B4 opposite to B3. In this way it is possible to separate the ions present in FN2 and a third ion beam FI3 is produced, whose direction intersects those of beams FN1 and FN2. A third neutralization cell N3 makes it possible to partly neutralize said beam and obtain a third neutral particle beam FN3. The three beams FN1, FN2 and FN3 penetrate the machine M by the same exhaust tube Q.

Naturally, the invention also covers the cases where a fourth neutralization is to be performed and so on. In general terms, on the basis of a neutral particle beam of rank N, i.e. FNN, a double deflection of the beam is effected, which gives rise to an ion beam of rank N+1, i.e. FIN+1 and a (N+1)th neutralization is performed, which gives a (N+1)th neutral particle beam, i.e. FNN+1. With N=1, a double neutralization is obtained, with N=2 a triple neutralization and so on.

The improvement of the neutralization efficiency, for an apparatus with two neutralizations, is easy to calculate. By designating the total ion current transmitted by the beam $I^+$ and the equivalent neutral particle current after passage through a neutralization cell as $IN_1$, as well as the neutralization efficiency as R, we obtain:

$$(I_n)_1 = rI^+ \text{ and } r = (I_n)_1/I^+$$

The ions which remain after a first neutralization are such that $I_1^+ = (1-r)I^+$.

The passage through a second neutralization cell will give:

$$(I_n)_2 = r(1-r)I^+$$

i.e. in all $$(I_n)_1 + (I_n)_2 = r + r(1-r)I^+ = r_2I^+$$

Thus, the gain obtained on passing from one to two neutralizations is:

$$G_{2,1} = r_2/r = 2 - r$$

in the same way, for n neutralization stages, the gain will be:

$$G_{n \cdot 1} = \frac{r_n}{r} = \sum_{m=1}^{m=n} (1-r)^{m-1}$$

Figure 2:
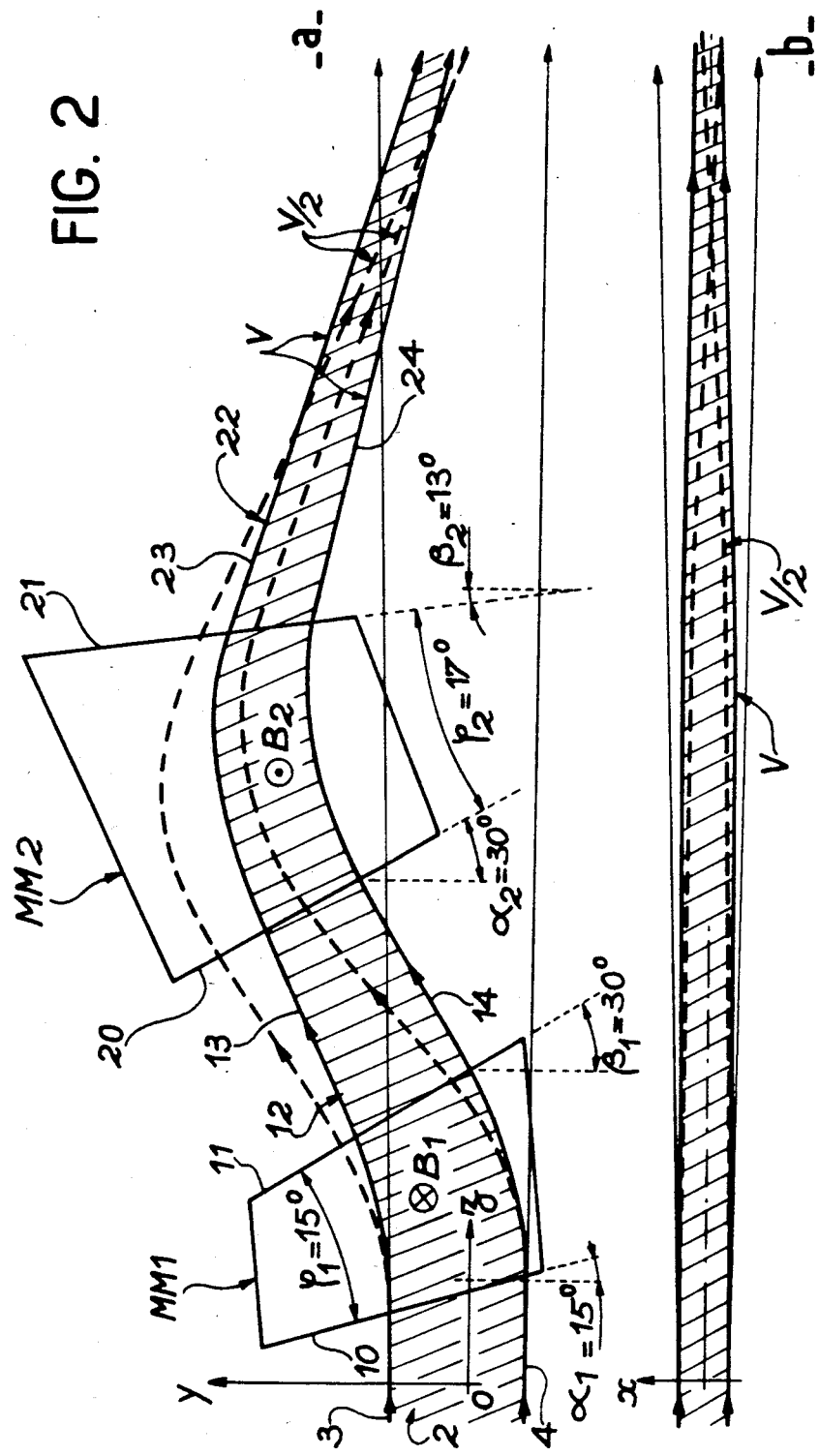
FIG. 2, the ion trajectories obtained in a quasi-achromatic magnetic doublet system.

FIG. 2 makes it possible to define the shape of the trajectories of the ion in the double deflection system used in the invention, which is called a quasi-achromatic magnetic doublet system.

FIG. 2 has an upper part a representing a plane y0z, the axis 0z being directed in the displacement direction of the neutral particles and a lower part b representing the plane x0z. The magnetic fields are assumed to be directed along 0x. Thus, the trajectories of the ions remain in plane y0z. Thus, it is the upper part which is of greatest interest here, the lower part only serving to show the slight convergence in plane x0z.

The quasi-achromatic magnetic doublet represented symbolically in FIG. 2 comprises a first means MM1 having an entrance face 10 and an exit face 11. These two faces are perpendicular to plane y0z, which is that of the upper part a in FIG. 2. In the same way, the second means comprises an entrance face 20 and an exit face 21, which are also perpendicular to the plane y0z.

In the illustrated embodiment, the entrance face 10 forms an angle $\alpha 1$ of 15° with respect to 0y and the exit face 11 an angle $\beta 1$ of 30°, which means that the faces 10 and 11 of the first means MM1 form a dihedron of angular aperture $\rho 1$ of 15°. Moreover, the entrance face 20 forms an angle $\alpha 2$ of 30° with 0y and the exit face 21 an angle of 13°. This means that faces 20, 21 of the second means MM2 form a dihedron of angular aperture $\rho 2$ of 17°.

Beam 2 is limited by an upper edge 3 and a lower edge 4. after passage in MM1, a beam 12 is obtained, which is limited at the top by 13 and at the bottom by 14. After passage in MM2, a beam 22 is obtained, which is limited at the top by 23 and at the bottom by 24. This beam 22 converges towards the right-hand part of the drawing.

This beam is assumed to correspond to ions, whose energy is V electron volts. However, FIG. 2 also shows in broken line form the trajectory of ions, whose energy will be half less, V/2. It can be seen that these two beams converge in the same volume after passage in the two sectors. This constitutes the achromaticity property of the system. It can also be seen that the direction of the beam of neutral particles is not significantly modified on passing through the quasi-achromatic magnetic doublet system.

With regards to the other means of the apparatus according to the invention and in particular the positive ion sources, it can be said that these sources supplying beams with a rectangular cross-section adapted to said procedure are known and supply high current densities (2000 A/m$^2$) for accelerating voltages of 160 kV.

A description of such sources is e.g. provided in the communication by FUMELLI et al, provided at the 13th Symposium on Fusion Technology (SOFT) in Varenna, Italy, 1984 (report pages 617-623).

No special problems are caused by extrapolation to 200 or 300 kV.

It is known that the neutralization cells N1 and N2 operate with supersonic high density gas jets. Such equipment is known. A description thereof is contained in the work by ANDERSON entitled "Gas Dynamics—Molecular Beams", 1958.

Supersonic jets of $CO_2$ or neon (for example), which are necessary for high energy neutralization and produced in equipment having convergent and divergent Laval nozzles followed by a "knife" defining the gaseous jet.

Figure 3:
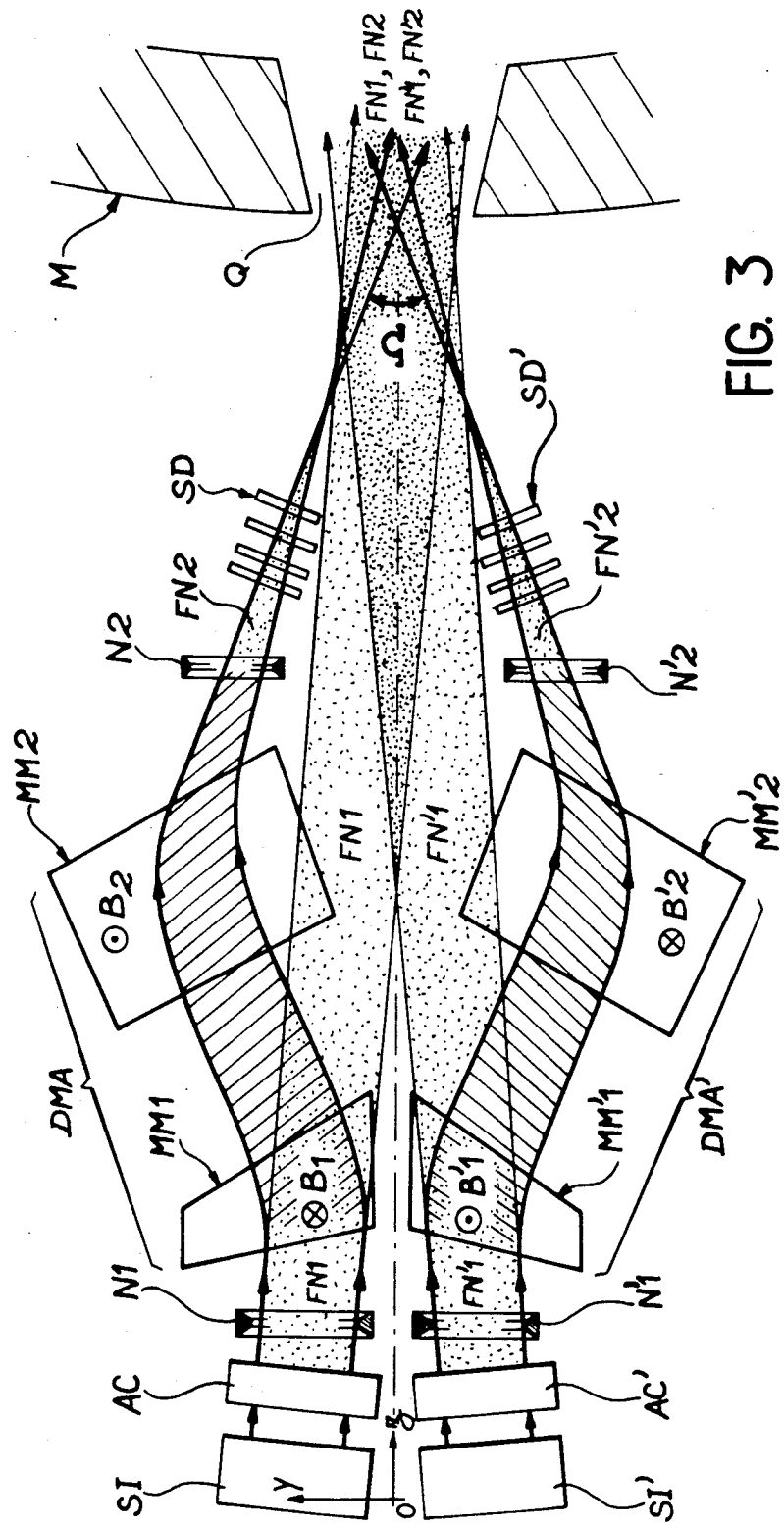
FIG. 3, an embodiment of a double neutralization apparatus.

FIG. 3 shows in exemplified manner an embodiment of a apparatus according to the invention. There are two devices positioned symmetrically with respect to a plane perpendicular to the plane of the drawing. Only one of these devices will be described, namely that of the upper half, the other having the same means and are designated by the same reference numerals, but to which an apostrophe has been added.

Thus, the apparatus comprises in its upper half, an ion source SI and an accelerator AC, a first neutralization cell N1 supplying a first beam of neutral particles FN1, a quasi-achromatic magnetic doublet system formed by two magnetic means MM1 and MM2, a second neutralization cell N2 supplying a second beam of neutral particles FN2 and a structure SD for decelerating the ions remaining in beam FN2. Such a double apparatus thus supplies four beams of neutral particles FN1, FN2 and FN'1 and FN'2.

The apparatus according to the invention preferably works with beams having a rectangular cross-section, whose large sides are parallel to 0y and whose small sides are parallel to the plane of the drawing along 0x.

Figure 4:
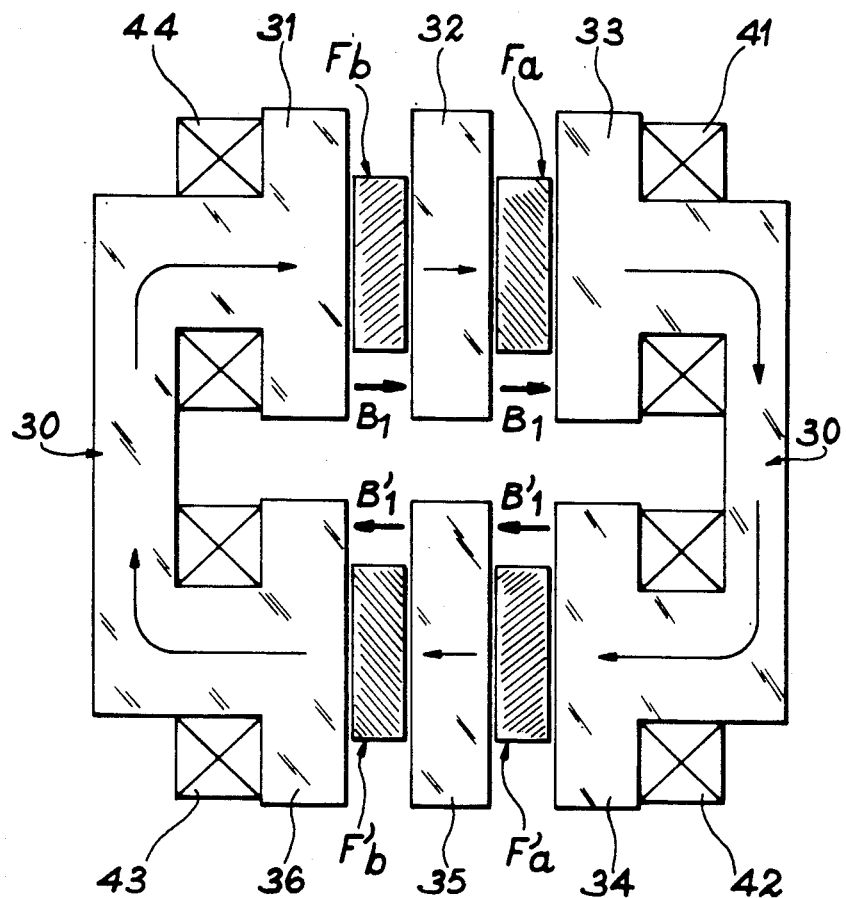
FIG. 4, in section a magnet structure permitting the simultaneous diffusion of four ion beams.

In the variant illustrated in FIG. 3, each device can in itself comprise two or more juxtaposed individual devices. Thus, this requires one ion source for four ion beams and magnetic means able to act on four beams having a rectangular cross-section. An embodiment of these means is illustrated in FIG. 4. It is a magnetic core 30 having six pole pieces 31 to 36, which define between them four zones, containing a field oriented in two opposite senses. The four ion beams FA, FB, F'A, F'B pass respectively between the pole pieces 31, 32/32, 33/34, 35/35, 36 in a direction perpendicular to plane of the drawing. The fields are produced by four coils 41 to 44. The arrows indicate the direction of the forces to which the ions are subjected.

The structure described hereinbefore makes it possible to obtain an injected neutral particle power level of 8 MW per exhaust tube with 300 keV per particle $\vec{D_1^0}$, with an ion source having four exits of sizes (15×45) cm², whereas in the conventional method using neutralization by deuterium, the injected power is a maximum of 5 MW at 110 keV per particle $\vec{D_1^0}$.

In practice, the number of operations is limited to n=3 for the following reasons. The total length L of the injection line is proportional to n and with n=2 one obtains L=6 meters and with n=3 L=10 meters. Beyond this, the effective transmission decreases and part of the benefit obtained from the recycling operations is lost. The maximum injection angle of the particles into the machine is limited by the geometry of the intake tubes. However $\Omega$=Bn and for this second reason it is reasonable not to exceed n=3. Finally, with n=3, the gain on the neutralization efficiency is adequate for the applications of the method, because $r_3$ is approximately 40% at 300 kV($D_1^+$).

What is claimed is:

1. A process for the formation of high energy atom beams comprising the steps of:
   producing positive ions with the aid of an ion source;
   accelerating said ions to form a first ion beam;
   partially neutralizing said first beam by making it pass through a first neutralization cell to obtain, at the outlet from said cell, a first beam containing high energy neutral atoms;
   applying to the beam leaving the first neutralization cell a first magnetic field having a first direction perpendicular to the direction of said beam, which has the effect of separating the ions still present from the neutral particles by deflecting these ions, which form a second ion beam with a direction differing from that of the first beam containing the neutral particles;
   applying to said second ion beam a second magnetic field having the same direction as that of the first field, but in the opposite direction, which has the effect of again deflecting the ion beam and giving it a new direction crossing the direction of the first neutral particle beam; and
   partially neutralizing said doubly deflected second ion beam by making it traverse a second neutralization cell so that, on leaving said second cell a second beam is obtained which contains neutral atoms and moves toward the first beam of neutral particles leaving the first neutralization cell.

2. A process according to claim 1, including the further steps of:
   applying to the second neutral particle beam third and fourth magnetic fields operating in the same way as the first and second magnetic fields to obtain a third ion beam; and
   neutralizing said third beam by a third neutralization cell, which supplies a third neutral particle beam, said third beam moving toward the two first beams.

3. A process according to claim 2, wherein after obtaining n beams containing neutral particles, a (n+1)th is formed therefrom by the steps of:
   applying to the nth beam containing neutral particles, two magnetic fields of opposite senses to bring about a double deflection of the ions still present in said nth beam; and
   partially neutralizing said doubly deflected beam, the (n+1) beams containing the neutral particles intersecting in pairs, n being equal to or lower than 3.

4. A process according to any one of the claims 1 to 3, including the step of decelerating any ions still present in the final beam obtained after the final neutralizing step.

5. A process according to claim 1, wherein said neutralizing steps comprise passing a beam through a gas, whose atoms are heavier than deuterium.

6. An apparatus for the formation of high energy neutral atom beams comprising:
   a positive ion source coupled with an ion accelerator forming a first ion beam;
   a first neutralization cell placed on the path of said ion beam from the accelerator, said cell supplying a first beam containing high energy neutral atoms;
   a first magnetic means for applying to the beam leaving the first neutralization cell a first magnetic field, having a first direction perpendicular to the direction of said beam, for separating the ions still present and the neutral particles by deflecting said ions, said deflected ions forming a second ion beam having a direction differing from that of the first beam containing the neutral particles; and
   a second magnetic means for applying to the second ion beam a second magnetic field having the same direction as the first field, but which is of the opposite polarity, for deflecting the second ion beam and giving it a new direction moving toward the direction of the first neutral particle beam; a second neutralization cell placed on the path of the second doubly deflected ion beam, said second cell supplying a second beam containing neutral atoms, said second beam moving towards the first beam containing neutral particles leaving the first neutralization cell.

7. An apparatus according to claim 6, wherein it also comprises third and fourth magnetic means, which are operationally identical to the first and second magnetic means, for doubly deflecting the second beam containing the neutral particles; a third neutralization cell placed on the ion beam doubly deflected by the third and fourth magnetic means, said third cell supplying a third beam containing neutral atoms, said third beam moving towards the first two beams.

8. An apparatus according to claim 6, wherein it comprises, following the first neutralization cell, n pairs of magnetic means for applying parallel magnetic fields of opposite polarity to the respective beam; and
   n neutralization cells, each placed after a respective one of the pairs of magnetic means for at least partially neutralizing ions in said beam, said apparatus supplying (n+1) beams containing neutral particles.

9. An apparatus according to any one of the claims 6 to 8, wherein it comprises, on the trajectory of the beam obtained following the last neutralization cell, an ion decelerating structure.

10. An apparatus according to claim 6 comprising a plurality of neutralization cells and magnetic means pairs for providing a plurality of neutral particle beams arranged in juxtaposed manner and operating in planes which converge.

11. An apparatus according to claim 10 comprising at least two neutral particle beams arranged symmetrically with respect to a plane.

12. An apparatus according to claim 11, wherein it comprises an ion source with four beams, four first neutralization cells, four first means for forming a first magnetic field, four second means for forming a second magnetic field, four second neutralization cells and four ion decelerating structures.

13. An apparatus according to claim 12, wherein the pairs of magnetic means acting on the same ion beam are constituted by a quasi-achromatic magnetic doublet.

* * * * *